(12) United States Patent
Kita et al.

(10) Patent No.: US 8,036,082 B2
(45) Date of Patent: Oct. 11, 2011

(54) OPTICAL DISK DRIVE CARRY OUT FOCUS PULLING-IN WITH IMPROVED OPERATION ACCURACY

(75) Inventors: Naoya Kita, Tokyo (JP); Hideki Mutou, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 272 days.

(21) Appl. No.: 12/443,240

(22) PCT Filed: Sep. 3, 2007

(86) PCT No.: PCT/JP2007/067138
§ 371 (c)(1),
(2), (4) Date: Mar. 27, 2009

(87) PCT Pub. No.: WO2008/068934
PCT Pub. Date: Jun. 12, 2008

(65) Prior Publication Data
US 2010/0074079 A1    Mar. 25, 2010

(30) Foreign Application Priority Data
Dec. 8, 2006   (JP) ................................. 2006-332260

(51) Int. Cl.
*G11B 7/00* (2006.01)
(52) U.S. Cl. .................................. 369/53.35; 369/47.39
(58) Field of Classification Search .................. None
See application file for complete search history.

(56) References Cited

U.S. PATENT DOCUMENTS

| | | | | |
|---|---|---|---|---|
| 2002/0048237 A1* | 4/2002 | Suzuki et al. | .............. | 369/44.29 |
| 2004/0109397 A1* | 6/2004 | Nishiguchi | ................ | 369/44.27 |
| 2005/0117460 A1* | 6/2005 | Sato et al. | .................. | 369/30.03 |
| 2005/0265136 A1* | 12/2005 | Wu | ............................ | 369/44.11 |
| 2006/0023593 A1* | 2/2006 | Anderson et al. | ............ | 369/53.1 |

FOREIGN PATENT DOCUMENTS

| | | |
|---|---|---|
| JP | 6-139584 A | 5/1994 |
| JP | 9-16974 A | 1/1997 |
| JP | 2000-155953 A | 6/2000 |
| JP | 2002-109754 | 4/2002 |
| JP | 2004-030920 | 1/2004 |

* cited by examiner

*Primary Examiner* — Peter Vincent Agustin
*Assistant Examiner* — Emily Frank
(74) *Attorney, Agent, or Firm* — Birch, Stewart, Kolasch & Birch, LLP.

(57) ABSTRACT

An optical disk drive includes a servo control unit 7 for causing an optical disk A to be driven; an optical pickup 2 for reading recorded data from the recording surface of the optical disk A after carrying out focus pulling-in of an object lens; a CPU 8 for controlling the servo control unit 7 and optical pickup 2 to perform readout operation of data recorded on the optical disk A; and a temperature detecting unit 9 for detecting temperature in the optical disk drive. The CPU 8 calculates the focus pull-in level in accordance with the temperature detected by the temperature detecting unit 9, and carries out the focus pulling-in of the optical pickup 2 using the focus pull-in level.

1 Claim, 3 Drawing Sheets

OPTICAL DISK DRIVE CARRY OUT FOCUS PULLING-IN WITH IMPROVED OPERATION ACCURACY

TECHNICAL FIELD

The present invention relates to an optical disk drive for handling an optical disk such as a CD and DVD as a recording medium.

BACKGROUND ART

In a device that handles an optical disk such as a CD or DVD, an optical pickup irradiates the information recording surface of the optical disk with a beam of light, receives reflected light from the optical disk while carrying out focus control, and reads out recorded data. In addition, to perform the focus control, a focus search is carried out before starting the readout operation. In the focus search, a focus error signal indicating a light receiving state of the optical pickup is generated; a predetermined level of the signal is set as a focus pull-in level in advance; the object lens of the optical pickup is moved in the direction perpendicular to the recording surface of the optical disk; and when the focus error signal reaches the focus pull-in level by the movement, the focus pulling-in is carried out which adjusts the focus of the object lens by controlling the movement. In this way, the focus pulling-in is carried out using the predetermined fixed value of the focus pull-in level.

In addition, there is a device that has a focus error signal learning means; learns the maximum value and minimum value of the focus error signal level during a learning period; and carries out focus pulling-in, that is, adjusts the focus of the object lens by using the maximum value and minimum value the focus error signal learning means learns during the pull-in control period (see Patent Document 1, for example). Incidentally, in the learning described above, level variations of the focus error signal due to temperature changes are not considered.

Patent Document 1: Japanese Patent Laid-Open No. 2000-155953 (Pages 4-6 and FIGS. 1 and 2)

With the foregoing construction, since the conventional optical disk drive utilizes the fixed or initial focus pull-in level on startup when carrying out refocusing pulling-in such as when the focus control gets out of place because of disturbance like scratches or vibrations of an optical disk during playback operation or data readout, or when carrying out a focus jump such as when repeating STOP/PLAY operation or handling a multilayer structure optical disk, it becomes difficult to carry out the focus pulling-in reliably because of the temperature within the optical disk drive. In particular, if the level of the focus error signal varies due to self-heat-generation of the optical disk drive or changes in the ambient temperature, a problem arises in that it becomes difficult to carry out the refocusing pulling-in or a focus jump well.

The present invention is implemented to solve the foregoing problem. Therefore it is an object of the present invention to provide an optical disk drive capable of carrying out the focus pulling-in in accordance with the temperature within the device.

DISCLOSURE OF THE INVENTION

An optical disk drive in accordance with the present invention has a control means which calculates a focus pull-in level according to the temperature detected by a temperature detecting means, and carries out the focus pulling-in of the optical pickup using the focus pull-in level.

According to the present invention, the focus pulling-in of the optical pickup is carried out after calculating the focus pull-in level in accordance with the temperature detected by the temperature detecting means. Accordingly, it has an advantage of being able to carry out the focus pulling-in at higher operation accuracy independently of the temperature in the optical disk drive.

BEST MODE FOR CARRYING OUT THE INVENTION

The best mode for carrying out the invention will now be described with reference to the accompanying drawings to explain the present invention in more detail.

Embodiment 1

Figure 1:
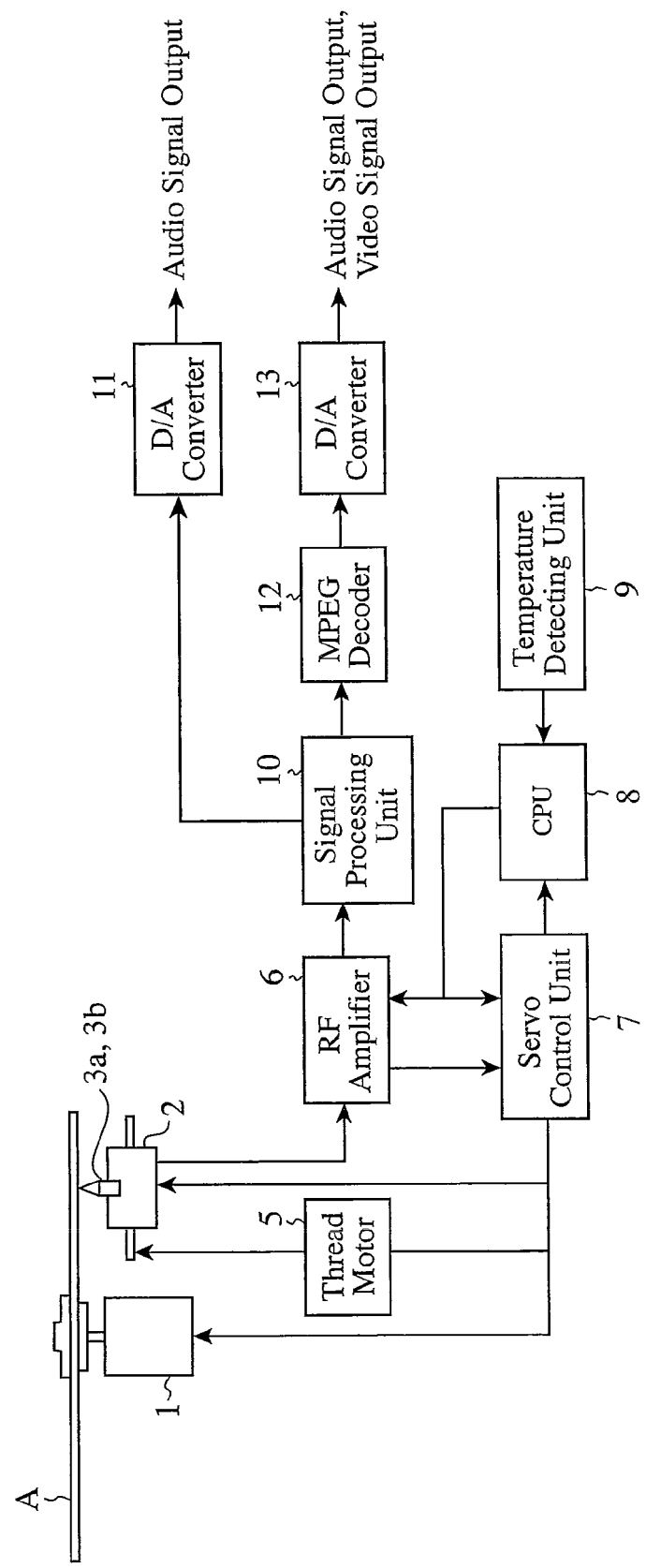
FIG. 1 is a block diagram showing a configuration of an optical disk drive of an embodiment 1 in accordance with the present invention.

FIG. 1 is a block diagram showing a configuration of an optical disk drive of an embodiment 1 in accordance with the present invention. It shows a schematic configuration of a DVD/CD playback device as an example of the optical disk drive. An optical disk A like a CD or DVD, when loaded on the optical disk drive, is supported by a structure comprising a spindle, loading component and the like not shown, and is placed on the optical disk drive in such a manner as to be rotated by a spindle motor 1. Under the optical disk A placed on the optical disk drive, an optical pickup 2 is disposed which has a focus actuator 3a and a tracking actuator 3b.

The optical pickup 2 is installed in such a manner as to be slid in the direction of the radius of the optical disk A by the drive of a thread motor 5. In addition, the optical pickup 2 is connected in such a manner as to output a digital signal such as data read out from the optical disk A to an RF amplifier 6.

The optical pickup 2 has an optical beam radiating unit such as a laser diode not shown, a light-receiving unit for receiving light reflected off the recording surface of the optical disk A, and an object lens for focusing the light beam and the reflected light from the laser diode. The focus actuator 3a is constructed in such a manner as to move the object lens in the direction perpendicular to the recording surface of the optical disk A. The tracking actuator 3b is constructed in such a manner as to move the object lens in parallel to the recording surface of the optical disk A, and more particularly to move it onto a track formed on the disk recording surface.

The RF amplifier 6, for example, has a focus error signal generating unit not shown for generating the focus error signal indicating the light receiving state of the optical pickup 2. As for the focus error signal generating unit, its configuration is not limited to that included in the RF amplifier 6.

A servo control unit 7 is connected in such a manner as to receive the focus error signal from the RF amplifier 6 and to control the operation of the spindle motor 1, optical pickup 2 and thread motor 5.

A CPU 8 is connected in such a manner as to receive the control signal output from the servo control unit 7 and the output signal from a temperature detecting unit 9 and to control the operation of the RF amplifier 6 and servo control unit 7. The temperature detecting unit 9 is installed in the optical disk drive to detect its internal temperature. A signal processing unit 10 is connected in such a manner as to receive the output signal of the RF amplifier 6 and output the processed signal to a D/A converter 11 and an MPEG decoder 12. The D/A converter 11 is configured and connected in such a manner as to output the audio signal generated by the D/A conversion to the outside of the optical disk drive. The MPEG decoder 12 is connected in such a manner as to output the decoded signal to a D/A converter 13. The D/A converter 13 is configured and connected in such a manner as to output the audio signal and video signal generated by the D/A conversion to the outside of the optical disk drive.

Next, the operation will be described.

Here, in the operation of the optical disk drive, only the operation of reading data out of the optical disk, in particular the operation characteristic to the optical disk drive of the embodiment 1, will be described with detailed description of the other operation being omitted.

Figure 2:
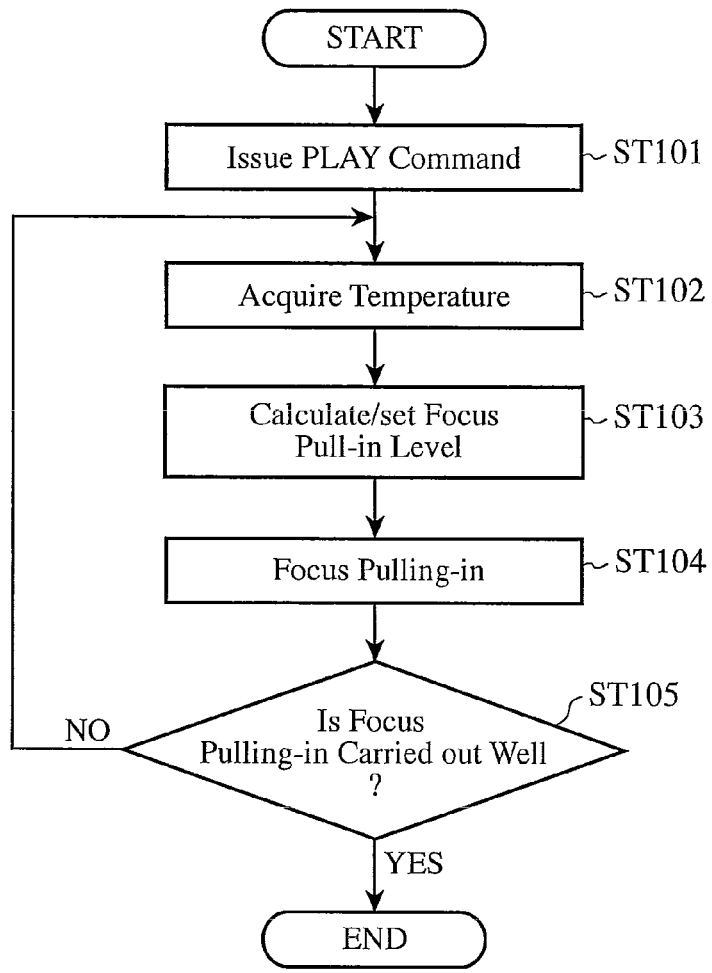
FIG. 2 is a flowchart showing the operation of the optical disk drive of the embodiment 1.

FIG. 2 is a flowchart showing the operation of the optical disk drive of the embodiment 1. The figure shows the control the CPU 8 carries out on the individual units. For example, a user operates a console not shown in FIG. 1 to play back the optical disk A or to read out the data recorded. In response to the operation, a prescribed control signal instructing to read out data from the optical disk A is input to the CPU 8. Then the CPU 8 generates a PLAY command to read out data recorded on the optical disk A, and issues it to the RF amplifier 6 and servo control unit 7 (step ST101).

When the PLAY command is issued to read out data from the optical disk A, the focus search is carried out, first. For example, the optical pickup 2 is moved onto a prescribed position by driving the thread motor 5 and focus search is performed at the position. More specifically, when the PLAY command is issued during the process of the foregoing step ST101, the servo control unit 7 drives the spindle motor 1, optical pickup 2 and thread motor 5 to establish a state of carrying out the scanning operation on the recording surface of the optical disk A, that is, the focus search. For example, by driving the thread motor 5, the servo control unit 7 moves the optical pickup 2 to the prescribed position at the lower part of the optical disk A in the optical disk drive.

The CPU 8 receives the temperature detecting signal from the temperature detecting unit 9 at the focus search, acquires the internal temperature of the optical disk drive (step ST102), and recognizes the temperature in the optical disk drive indicated by the temperature detecting signal such as the ambient temperature of the devices used for the light-receiving operation of the optical pickup 2. In accordance with the temperature, the focus pull-in level is calculated and set (step ST103).

More specifically, the CPU 8 receives, when carrying out the focus search, the temperature detecting signal of the temperature detecting unit 9, and moves the object lens in the direction perpendicular to the recording surface of the optical disk A by driving the focus actuator 3a via the servo control unit 7. In other words, it moves the object lens in the up and down direction in FIG. 1 within a movable range. The focus error signal generating unit of the RF amplifier 6 generates the focus error signal indicating the light receiving state from the output signal of the light-receiving unit of the optical pickup 2, and outputs it to the CPU 8 via the servo control unit 7, for example. The CPU 8 obtains the focus pull-in level from the focus error signal at the time when moving the object lens in the perpendicular direction.

The focus pull-in level is obtained by detecting the level peak value such as the maximum value of the focus error signal when moving the object lens as described before, and by using a calculation expression $FEmax \times 0.6 \times t$ where FEmax is the maximum value, and t is a temperature coefficient for carrying out the temperature correction at the focus pull-in level, which has a predetermined value corresponding to the temperature detecting signal value output from the temperature detecting unit 9. The temperature coefficient t is prestored in a nonvolatile storage unit in the CPU 8 in such a manner as to form a table where individual values of the temperature coefficient t are associated with individual values of the temperature detecting signal, that is, individual temperatures. The CPU 8 acquires the temperature coefficient t corresponding to the current temperature in the optical disk drive from the table, and calculates the focus pull-in level. Thus, the CPU 8 carries out the calculation by changing the temperature coefficient t in accordance with the temperature detecting signal value input from the temperature detecting unit 9, and sets the focus pull-in level adapting to the temperature in the optical disk drive.

The CPU 8 controls the servo control unit 7, and carries out the focus pulling-in using the focus pull-in level set as described above (step ST104). The focus pulling-in using the focus pull-in level is carried out in a manner mostly similar to that of the conventional optical disk drive.

Figure 3:
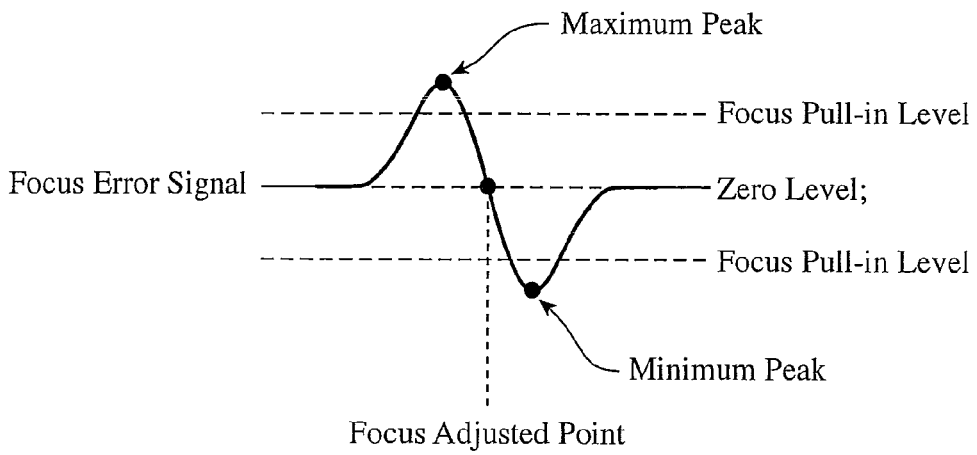
FIG. 3 is a diagram showing the operation of the optical disk drive of the embodiment 1.

FIG. 3 is a diagram explaining the operation of the optical disk drive in the embodiment 1.

When the object lens is moved in the perpendicular direction as described above, the level of the focus error signal varies in the waveform of the letter S as shown in FIG. 3. For example, in the process at the foregoing step ST103, the CPU 8 detects the peak values at the maximum peak and minimum peak of the waveform of the letter S shown in FIG. 3, calculates the focus pull-in level using the peak values as the foregoing FEmax, and detects the zero level at the middle of the two focus pull-in levels obtained, that is, the focus adjusted point of the lens.

Observing the focus error signal level, the CPU 8 controls the servo control unit 7 to move the object lens by driving the focus actuator 3a. When the focus error signal level observed reaches the focus pull-in level calculated and set as described above, the CPU 8 controls the servo control unit 7 to adjust the operation of the focus actuator 3a, and controls the movement of the object lens in such a manner that it is placed at the zero level of the focus error signal, that is, at the focus adjusted point of the lens.

After the CPU 8 carries out the focus pulling-in by moving the object lens as described above and places the object lens at the focus adjusted point of the lens corresponding to the focus pull-in level set, the CPU 8 makes a decision as to whether the focus pulling-in has been performed well or not by detecting the signal indicating the light receiving state of the light-receiving unit of the optical pickup 2 such as the output signal level of the optical pickup 2 or the focus error signal level (step ST105). Unless the CPU 8 makes a decision that the focus pulling-in is carried out well, it returns the processing to step ST102 to detect the current temperature within the device and to execute the steps thereafter as described above, and retries the focus pulling-in. By making a retry in this way, the CPU 8 can carry out the focus pulling-in reliably by repeating the focus pulling-in until it makes a success, even though its previous try was unsuccessful.

If it makes a decision in the process at step ST105 that the focus pulling-in is carried out well, the CPU 8 completes the focus pulling-in control, and proceeds to the focus control. As the focus control, it controls the servo control unit 7, and closes a focus control loop so as to maintain the object lens at the focus adjusted point by driving the focus actuator 3a appropriately.

In addition, the CPU 8 controls the operation of the tracking actuator 3b, thread motor 5 and spindle motor 1 via the servo control unit 7 to operate the optical pickup 2 in such a manner as to readout the data recorded on the optical disk A successively.

The optical pickup 2 outputs the readout data signal to the RF amplifier 6. The RF amplifier 6 amplifies the level of the input data signal and outputs to the signal processing unit 10. The signal processing unit 10 discriminates the type and mode of the input data, and outputs to the D/A converter 11 if it is digital data representing an audio signal, and to the MPEG decoder 12 when it is data representing audio and video such as those conforming to the MPEG standards. The D/A converter 11 converts the audio signal of the input digital data to an audio signal of the analog signal, and outputs it to the outside of the optical disk drive. The MPEG decoder 12 decodes the input data in accordance with the MPEG standards, and generates the video signal and audio signal in the form of the digital data and outputs to the D/A converter 13. The D/A converter 13 converts the video signal and audio signal of the input digital data to the video signal and audio signal of the analog signal, and outputs them to the outside of the optical disk drive.

As described above, the embodiment 1 has the temperature detecting unit 9 for detecting the temperature in the optical disk drive, in which the CPU 8 calculates the focus pull-in level using the temperature coefficient t associated with the temperature within the device the temperature detecting unit 9 detects, and carries out the focus pulling-in using the focus pull-in level. Accordingly, it can set the optimum focus pull-in level even if the output signal level or the focus error signal level of the optical pickup 2 varies because of the influence of the self-heat-generation of the optical disk drive or the device ambient temperature, and can carryout the focus pulling-in reliably independently of the temperature in the optical disk drive, thereby offering an advantage of being able to improve the operation accuracy.

In addition, it can set the optimum focus pull-in level even when the focus error signal level varies because of the influence of the variations in the light-receiving sensitivity of the optical element constituting the light-receiving unit of the optical pickup 2 or the variations of the reflectance of the optical disk A, thereby offering an advantage of being able to carry out the focus pulling-in reliably and to improve the operation accuracy.

Embodiment 2

The optical disk drive of the embodiment 2 has the same configuration as that shown in FIG. 1. Here, duplicate description will be avoided of the same configuration as that of the optical disk drive of the foregoing embodiment 1. In addition, as for the individual units of the optical disk drive of the embodiment 2, the description will be made by designating the same or like components to those shown in FIG. 1 by the same reference numerals.

Next, the operation will be described.

Here, in the operation of the optical disk drive, only the operation of reading data out of the optical disk, in particular the operation characteristic to the optical disk drive of the embodiment 2, will be described with detailed description of the other operation being omitted.

Figure 4:
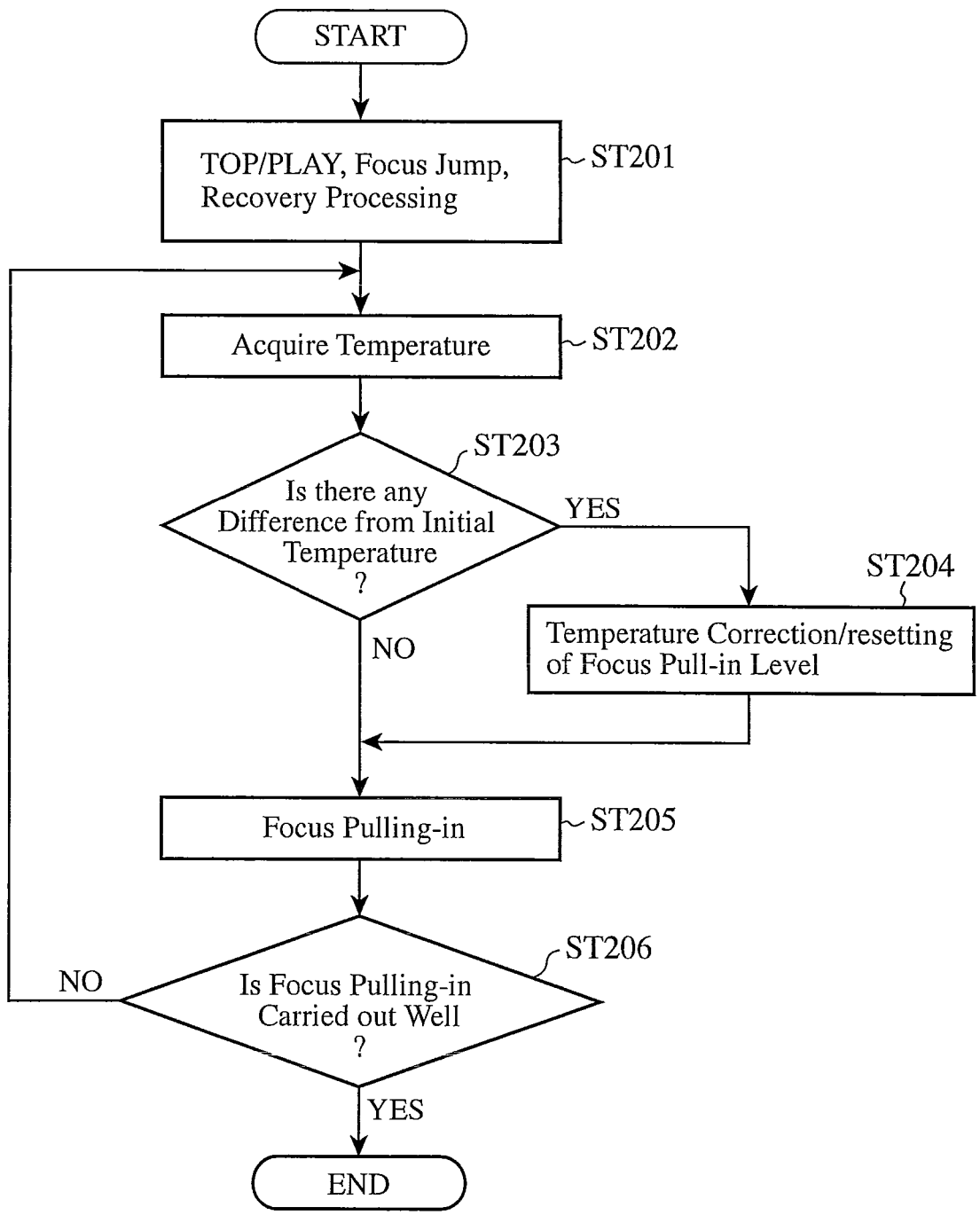
FIG. 4 is a flowchart showing the operation of an optical disk drive of an embodiment 2 in accordance with the present invention.

FIG. 4 is a flowchart showing the operation of the optical disk drive of the embodiment 2. The figure shows the control the CPU 8 carries out for the individual units when carrying out the focus pulling-in again after performing data readout from the optical disk A by carrying out the focus pulling-in once.

The CPU 8 has stored in its own volatile storage unit the focus pull-in level, which is calculated and set when performing the data readout or playback operation after carrying out the focus pulling-in, and the temperature at the time when calculating the focus pull-in level.

When a condition occurs of carrying out the focus pulling-in again, such as when redoing the playback operation, that is, when repeating the STOP/PLAY operation, when making a focus jump while handling a multilayer structure optical disk A, or when performing recovery processing because the focus control gets out of place owing to the disturbance due to vibrations during the data readout or playback operation or owing to scratches on the recording surface of the optical disk A (step ST201), the CPU 8 acquires the current temperature in the optical disk drive the temperature detecting unit 9 detects (step ST202). In the process at step ST202, the CPU 8 compares the current temperature indicated by the temperature detecting signal input from the temperature detecting unit 9 with the temperature it stores in its storage, that is, with the initial temperature, and makes a decision as to whether there is any temperature difference or not (step ST203).

Temperature correction coefficients tz, which are assigned to the individual values of the temperature difference obtained in the process at step ST203, have been set in advance, and a table consisting of the individual values of the temperature difference and the individual temperature correction coefficients tz is stored in the nonvolatile storage unit of the CPU 8, for example.

If the CPU 8 makes a decision in the process at step ST203 that there is temperature difference, it obtains the temperature correction coefficient tz corresponding to the value of the temperature difference from the table. The CPU 8 carries out the temperature correction by multiplying the focus pull-in level stored in the CPU 8 itself by the temperature correction coefficient tz, and sets the focus pull-in level matching the current temperature within the device again (step ST204). Using the focus pull-in level set again, the CPU 8 carries out the focus pulling-in in the same manner as the process at step ST104 described in the embodiment 1 (step ST205).

Unless the CPU 8 makes a decision that there is temperature difference in the process at step ST203, the CPU 8 carries out the focus pulling-in using the focus pull-in level stored in it (step ST205).

In the process at step ST205, the CPU 8 carries out the focus pulling-in by performing the processing operation similar to that in the process at step ST104 of FIG. 2 described in the embodiment 1. Subsequently, it makes a decision as to whether the focus pulling-in has been carried out well by performing the processing operation similar to that in the process at step ST105 of FIG. 2 (step ST206). Unless the CPU 8 makes a decision that the focus pulling-in has been carried out well, it returns to the process at step ST202, acquires the current temperature, and retries the focus pulling-in by performing the successive steps in the same manner. By making a retry in this way, the CPU 8 can carry out the focus pulling-in reliably by repeating the focus pulling-in until it makes a success, even though its previous try was unsuccessful.

If it makes a decision in the process at step ST206 that the focus pulling-in is carried out well, the CPU 8 operates the individual units in the same manner as when it makes a decision that the focus pulling-in is carried out well in the process at step ST105 described in the embodiment 1, carries out data readout or playback operation of the optical disk A after performing the focus control, and outputs the audio signal and video signal.

As described above, the embodiment 2 is configured in such a manner as to store the focus pull-in level the CPU 8 calculates and the temperature at the time of obtaining the focus pull-in level; obtains, when carrying out the focus pulling-in again, the difference between the current temperature the temperature detecting unit 9 detects and the temperature the CPU 8 itself stores, and corrects the stored focus pull-in level in accordance with the temperature difference; and carries out the focus pulling-in again using the corrected focus pull-in level. Accordingly, the present embodiment 2 can absorb the influence of the signal level changes even if the focus error signal level varies because of the changes in the temperature within the disk device during the operation, and offers an advantage of being able to improve the operation accuracy at the time of performing the focus pulling-in again or the focus jump.

Incidentally, the optical disk drive of the embodiment 1 and embodiment 2 is not limited to a playback-only optical disk drive.

INDUSTRIAL APPLICABILITY

As described above, since the optical disk drive in accordance with the present invention is made an optical disk drive capable of carrying out the focus pulling-in at higher operation accuracy independently of the temperature within the device by calculating the focus pull-in level in accordance with the temperature within the device, it is suitably applied to an optical disk drive handling an optical disk such as a CD or DVD as a recording medium.

What is claimed is:

1. An optical disk drive including a driver for driving an optical disk; an optical pickup including an object lens for irradiating the optical disk with a light beam and for reading out recorded data by carrying out a focus pulling-in of the object lens and by receiving reflected light from a recording surface of the optical disk; and a controller for controlling the driver and the optical pickup to perform readout operation of data recorded on the optical disk, the optical disk drive comprising:

a temperature detector for detecting temperature in the optical disk drive, wherein the controller detects a level peak value of a focus error signal while moving the optical pickup, calculates a focus pull-in level from the level peak value and a coefficient corresponding to the temperature detected by the temperature detector when the optical pickup is moving, carries out the focus pulling-in of the optical pickup using the focus pull-in level, makes a decision as to whether the focus pulling-in is carried out well or not using the focus error signal indicating a light receiving state of the optical pickup, and unless it makes a decision that the focus pulling-in is carried out well, it calculates the focus pull-in level in accordance with the current temperature the temperature detector detects, and retries the focus pulling-in using the focus pull-in level.

* * * * *